Patented May 20, 1952

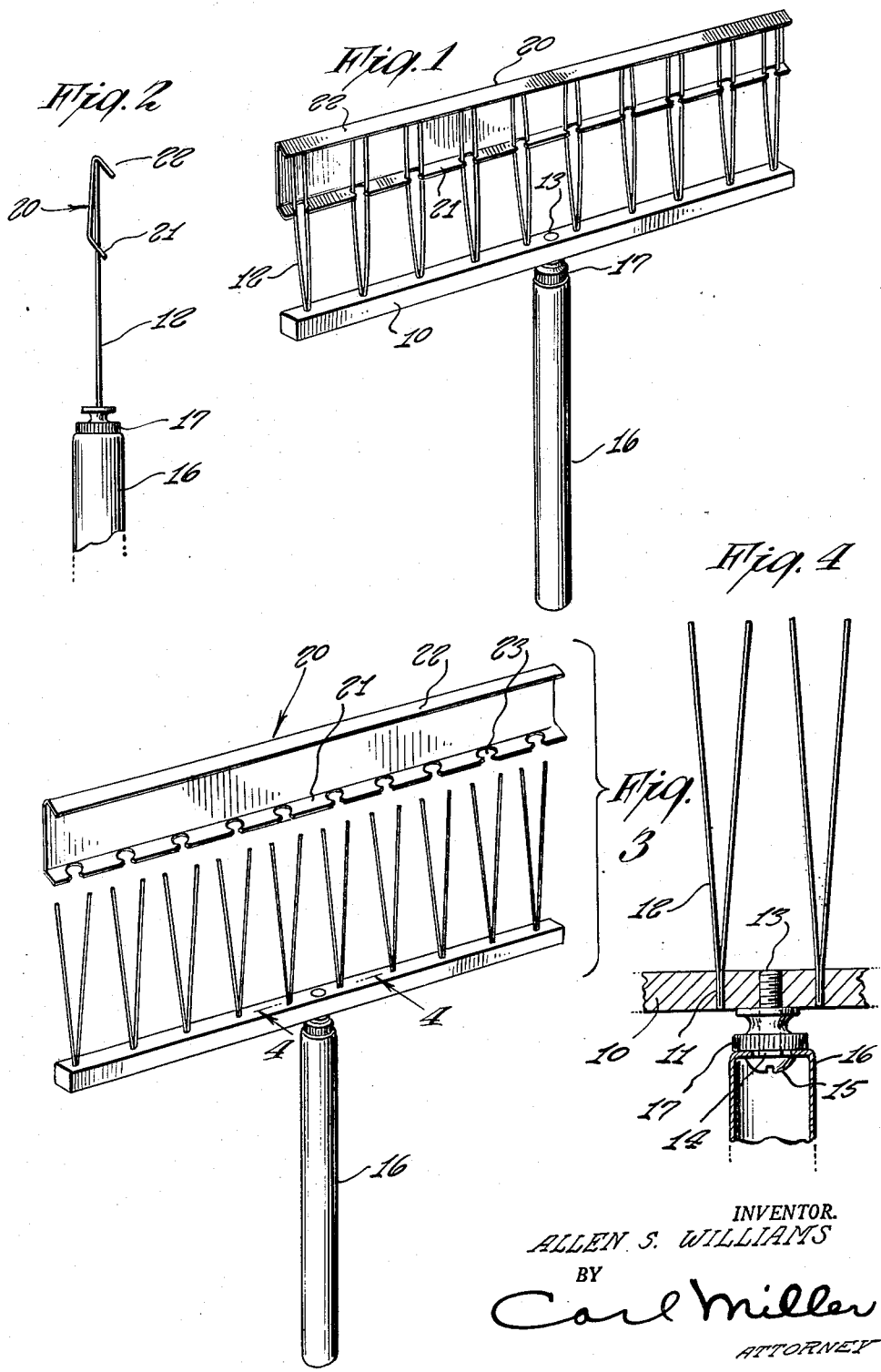

2,597,767

UNITED STATES PATENT OFFICE 2,597,767

PLASTER SCRATCHER

Allen S. Williams, Washington, D. C.

Application June 21, 1950, Serial No. 169,327

1 Claim. (Cl. 72—128)

This invention relates to a plaster scratcher.

It is an object of the present invention to provide a light weight tool by which plasterers, after the application of a coat of plaster on a wall or ceiling while the plaster is still moist, may scrape or score the same so as to provide a bond for a succeeding coat of plaster and without the plasterer becoming tired from the use of the tool.

It is another object of the present invention to provide a light weight plaster scratcher wherein the scratching elements can be protected when the tool is not in used and wherein the protective cover can be easily inserted over the scratching elements in a manner to draw the portions of the elements together and to provide a protecting flange over the ends of the elements.

Other objects of the present invention are to provide a plaster scratching tool which is of simple construction, inexpensive to manufacture, has a minimum number of parts, compact, durable, easy to handle and efficient in operation.

For other objects and for a better understanding of the invention, reference may be made to the following detailed description taken in connection with the accompanying drawing, in which Fig. 1 is a perspective view of the scratching tool embodying the features of the present invention with the protective cover disposed thereupon.

Fig. 2 is a side elevational view of the scratching tool with the cover in place.

Fig. 3 is a collective view of the plaster scratcher with the protecting cover spaced from the tool.

Fig. 4 is an enlarged fragmentary and sectional view taken on line 4—4 of Fig. 3.

Referring now to the figures, 10 represents a transverse bar which has a plurality of holes 11 therein longitudinally spaced from one another. These holes are adapted to receive bent wire scratching elements 12 of V-shape and with the closed bent portion joined with the openings in a tight manner so as to prevent the displacement of the elements from the bar.

Each bent scratching element has two portions which separate from one another and provide scratching ends.

Intermediate the length of the bar 10 is a threaded opening 13 receiving a securing bolt 14 having a head 15 that joins a hollow handle 16 with a locking nut 17.

By grasping the handle and dragging the ends of the scratching elements 12 through the soft plaster, a scoring will be effected upon the plaster to make easy the connection of a second layer of plaster thereto.

When the plaster scratcher is not in use and in order to protect the ends of the scratching elements 12, a cover member of channel shape is applied to the ends of the scratching elements. This cover in indicated at 20 and has parallel depressed lower and upper flanges 21 and 22. The lower flange has a series of slotted openings 23 for receiving the respective elements 12. To apply the protecting member 20, the flange 21 is disposed at a location not far from the root of the scratching elements 12 so that the scratching elements can be collected in the slotted openings 23 and by pulling upwardly on the protecting member, the portions of the elements can be drawn together so that their spring action against the sides of the slotted openings will prevent the easy removal of the protecting member 20 from the ends of the elements. To remove the protecting member 20, the same is pulled outwardly with some force from the ends of the scratching elements.

While various changes may be made in the detail construction, it shall be understood that such changes shall be within the spirit and scope of the present invention as defined by the appended claim.

Having thus set forth and disclosed the nature of my invention, what is claimed is:

A plaster scratching tool comprising a bar having a plurality of openings therein spaced from one another, a handle connected to the bar, and a plurality of V-shaped spring metal tines, the apex of each of said V-shaped tines being received in one of the said coordinated openings to engage the side walls thereof in a spring pressed manner, and a protective member of channel shape having depressed upper and lower flanges, said lower flange having a plurality of slotted openings, said slotted openings receiving said separable portions of the V-shaped tines upon locating the lower flange adjacent the ends of the scratching elements and said V-shaped tines extending towards said upper flange, whereby said protecting member will be held against displacement from the V-shaped tines under the spring action of the separable portions of the tines.

ALLEN S. WILLIAMS.

REFERENCES CITED

The following references are of record in the file of this patent:

UNITED STATES PATENTS

| Number    | Name   | Date         |
|-----------|--------|--------------|
| 1,760,107 | Benson | May 27, 1930 |